US008905908B2

(12) United States Patent
Matsuguma et al.

(10) Patent No.: US 8,905,908 B2
(45) Date of Patent: Dec. 9, 2014

(54) LUBRICANT SUPPLYING METHOD, SUPPORTING MEMBER AND ROTATABLE MEMBER UNIT

(75) Inventors: Minoru Matsuguma, Suntou-gun (JP); Jun Miyamoto, Mishima (JP); Kenji Matsuda, Numazu (JP); Akira Higeta, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 13/050,202

(22) Filed: Mar. 17, 2011

(65) Prior Publication Data

US 2011/0245054 A1    Oct. 6, 2011

(30) Foreign Application Priority Data

Mar. 31, 2010    (JP) .................................. 2010-082634

(51) Int. Cl.
*F16C 13/00* (2006.01)
*F16C 1/24* (2006.01)
*F16C 35/02* (2006.01)
*F16C 17/02* (2006.01)
*F16C 33/10* (2006.01)
*G03G 21/00* (2006.01)

(52) U.S. Cl.
CPC ............ *G03G 21/0094* (2013.01); *F16C 17/02* (2013.01); *F16C 33/10* (2013.01)
USPC ............... 492/15; 492/18; 384/322; 384/373; 384/419; 184/100

(58) Field of Classification Search
CPC .... F16N 9/02; F16N 9/00–9/04; F16C 13/02; F16C 13/00; F16C 31/02; F16C 31/00; F16C 35/00; F16C 33/10; F16C 33/103; F16C 33/1045; F16C 17/02; B60R 17/00; B62D 55/15; D21G 1/0053; G03G 21/0094
USPC ........... 492/15, 18; 29/898.06, 898.1, 898.11, 29/895; 384/322, 372–375, 418, 419; 184/100
See application file for complete search history.

(56) References Cited

U.S. PATENT DOCUMENTS

| 817,683 | A | * | 4/1906 | Whalen | 384/290 |
| 2,710,236 | A | * | 6/1955 | Love | 384/272 |
| 3,332,536 | A | * | 7/1967 | Ebly et al. | 198/501 |
| 3,453,032 | A | * | 7/1969 | Oberle | 384/124 |

(Continued)

FOREIGN PATENT DOCUMENTS

| CN | 1648785 A | 8/2005 |
| CN | 1771469 A | 5/2006 |
| CN | 101609286 A | 12/2009 |
| JP | 5-197220 A | 8/1993 |

*Primary Examiner* — Sarang Afzali
(74) *Attorney, Agent, or Firm* — Fitzpatrick, Cella, Harper & Scinto

(57) ABSTRACT

A lubricant supplying method for supplying a lubricant to a sliding portion between a cylindrical rotatable member for use in an electrophotographic image forming apparatus and a supporting member for slidably supporting an inner peripheral surface at one end side of the rotatable member with respect to a rotational axis direction of the rotatable member, includes a step of engaging the supporting member, including a hollow portion and an opening which communicates with the hollow portion and is provided at a position in which the opening opposes the sliding portion, with the rotatable member at the one end side; and a step of supplying the lubricant from the hollow portion toward the sliding portion through the opening.

4 Claims, 6 Drawing Sheets

(56) References Cited

U.S. PATENT DOCUMENTS

| | | |
|---|---|---|
| 3,724,918 A | 4/1973 | Reinhoudt |
| 3,746,415 A * | 7/1973 | Thomson .................. 384/291 |
| 4,672,894 A * | 6/1987 | Hardin ..................... 101/348 |
| 5,441,349 A * | 8/1995 | Shimizu .................... 384/276 |
| 5,682,587 A | 10/1997 | Higeta et al. |
| 6,411,791 B2 | 6/2002 | Nittani et al. |
| 7,107,000 B2 | 9/2006 | Watanabe et al. |
| 7,491,161 B2 | 2/2009 | Taguchi |
| 8,208,845 B2 | 6/2012 | Hanano |
| 2005/0180788 A1 | 8/2005 | Watanabe et al. |
| 2006/0140672 A1 | 6/2006 | Taguchi |
| 2006/0165327 A1 * | 7/2006 | Chen et al. ................. 384/397 |
| 2008/0317522 A1 | 12/2008 | Ardery et al. |
| 2009/0317026 A1 | 12/2009 | Hanano |

\* cited by examiner

LUBRICANT SUPPLYING METHOD, SUPPORTING MEMBER AND ROTATABLE MEMBER UNIT

FIELD OF THE INVENTION AND RELATED ART

The present invention relates to a cylindrical rotatable member to be provided in an electrophotographic image forming apparatus and a technique for supplying a lubricant to a sliding portion between the rotatable member and a supporting member for slidably supporting an inner peripheral surface of the rotatable member.

In a monochromatic printer or the like using one-component toner containing a magnetic material, a method in which the toner is coated on a surface of an aluminum developing sleeve disposed inside a magnet roller and then is moved onto an image bearing member on which a latent image has been formed has been widely employed (Japanese Laid-Open Patent Application (JP-A) Hei 5-197220).

Further, as a constitution of the developing sleeve, a method in which flange members are mounted at both ends of a cylindrical aluminum cylinder so as to be integral with the aluminum cylinder and are supported so as to rotatably support the aluminum cylinder in an image forming apparatus has been widely employed. Such an image forming apparatus, as a recycling method of a process cartridge, a magnet was removed and then has been reused. Further, a technique in which the flange members are fixed to the aluminum cylinder by press-fitting, not by bonding, so as to eliminate cutting of the aluminum cylinder during the removal of the magnet has been disclosed (JP-A 2003-029535).

In recent years, for the purpose of reducing the number of parts, a constitution in which a supporting member, formed of an electroconductive resin material, also functioning as a sliding contact for an aluminum developing sleeve is slid on an inner circumferential surface of the developing sleeve has also be employed. According to this constitution, compared with the fixing by the press-fitting as described above, the supporting member can be further facilitated, so that an inside magnet roller can be removed further simply. As a result, this constitution is very effective also with respect to recycling.

On the other hand, in such a supporting constitution, in order to stabilize a contact resistance between the developing sleeve and the supporting member as an electrical contact, it is desirable that an electroconductive lubricant is used at a sliding surface between an inner surface of the developing sleeve and the supporting member.

However, in the case where grease is applied onto an outer circumferential surface and then the developing sleeve and the supporting member are applied, there is a possibility that the grease is extruded by the developing sleeve to be squeezed out at the outer circumferential surface of the developing sleeve. The squeezed-out grease can move around the outside of the developing sleeve to cause, e.g., various adverse effects such as an image defects and the like. For that reason, in a grease applying step, the grease may desirably be applied onto the inner circumferential surface of the developing sleeve and thereafter the developing sleeve may desirably be applied with the supporting member.

However, in the constitution as described above, it is not easy to apply the lubricant onto the inner circumferential surface of the developing sleeve with reliability. For example, when the supporting member is intended to be applied by being inserted into the developing sleeve after the lubricant such as the electroconductive grease is applied onto the inner circumferential surface of the developing sleeve by an injection syringe or the like, most of the applied electroconductive grease is moved to a rear side, so that the lubricant in a necessary amount is not present at the sliding portion in some cases. Further, it is also difficult to check the amount of application of the lubricant on the supporting member surface. For that reason, various conditions are added for controlling the application amount and thus in the conventional constitution, the grease application is required to be manually performed carefully in many cases. Thus, with respect to the lubricant application for improving slidability between the supporting member and the inner circumferential surface of the cylindrical rotatable member such as the developing sleeve, it has been desired that an operation is performed more efficiently.

SUMMARY OF THE INVENTION

The present invention has been accomplished in view of the above circumstances. A principal object of the present invention is to realize efficiency enhancement of an applying step of a lubricant onto a sliding portion between a cylindrical rotatable member and a supporting member.

According to an aspect of the present invention, there is provided a lubricant supplying method for supplying a lubricant to a sliding portion between a cylindrical rotatable member for use in an electrophotographic image forming apparatus and a supporting member for slidably supporting an inner peripheral surface at one end side of the rotatable member with respect to a rotational axis direction of the rotatable member, the method comprising:

a step of engaging the supporting member, including a hollow portion and an opening which communicates with the hollow portion and is provided at a position in which the opening opposes the sliding portion, with the rotatable member at the one end side; and a step of supplying the lubricant from the hollow portion toward the sliding portion through the opening.

These and other objects, features and advantages of the present invention will become more apparent upon a consideration of the following description of the preferred embodiments of the present invention taken in conjunction with the accompanying drawings.

Figure 4:
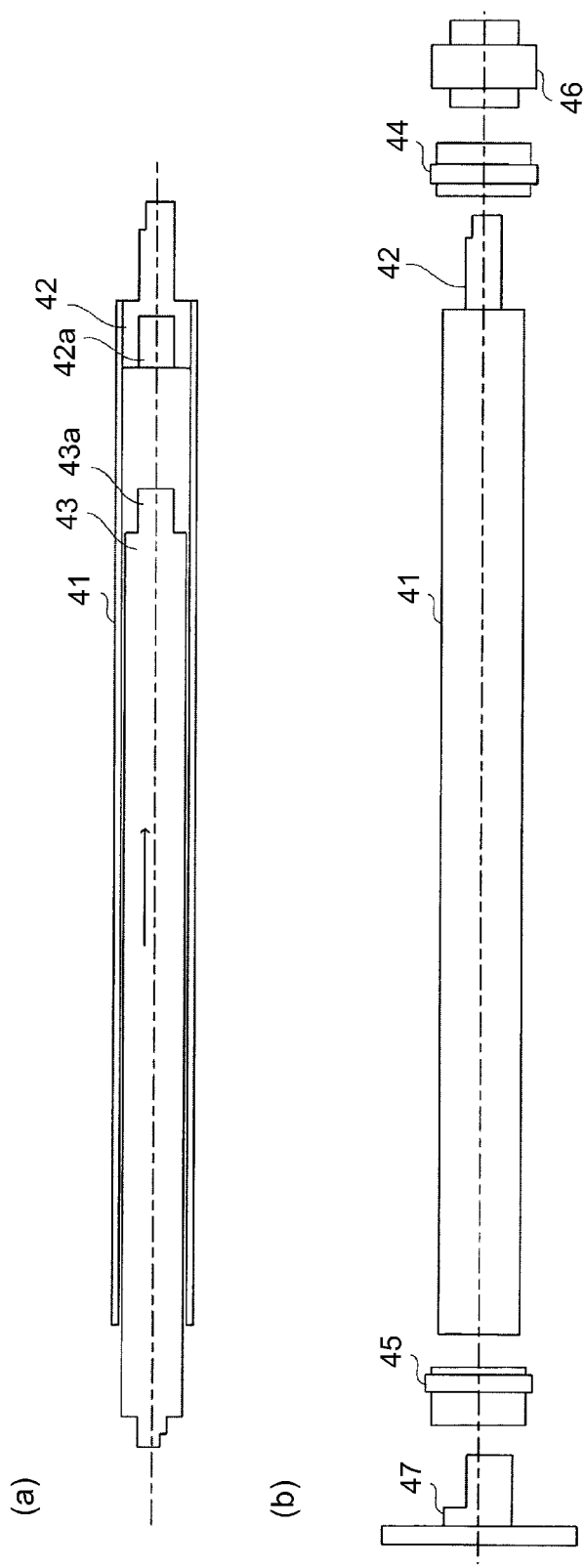

Parts (a) and (b) of FIG. 4 are schematic views for illustrating an assembling method of the developing sleeve unit in Embodiment 1.

Figure 5:
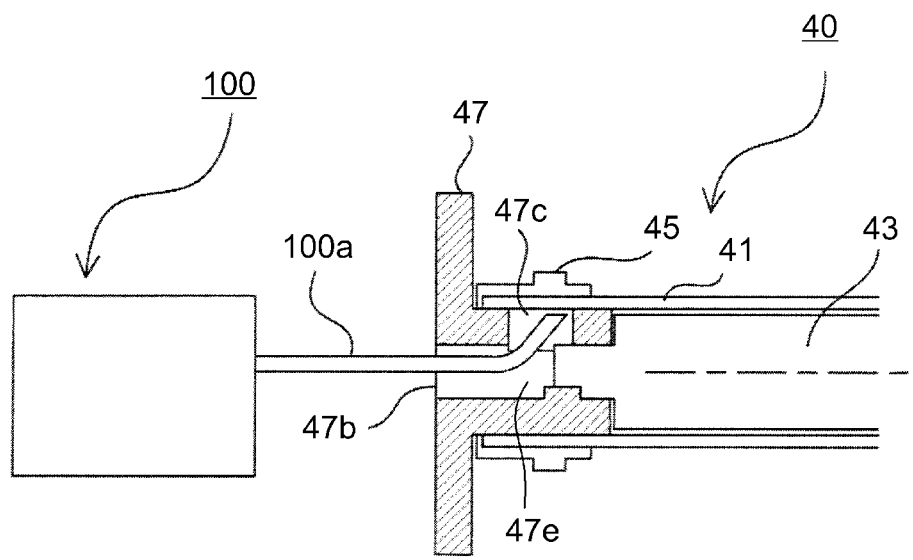

FIG. 5 is a schematic view showing a state in which a lubricant is applied onto a sleeve cylinder by a lubricant applying device.

Figure 6:
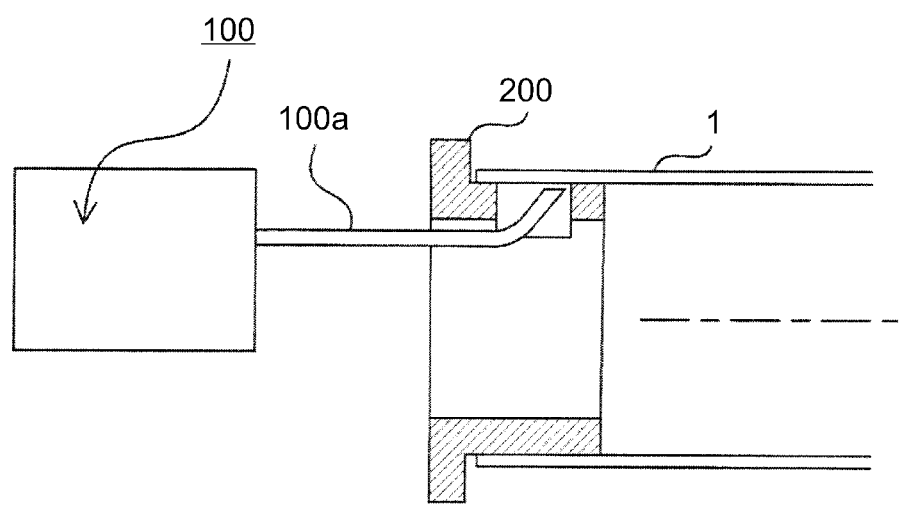

FIG. 6 is a schematic view showing a state in which the lubricant is applied onto a photosensitive drum by the lubricant applying device.

Figure 7:
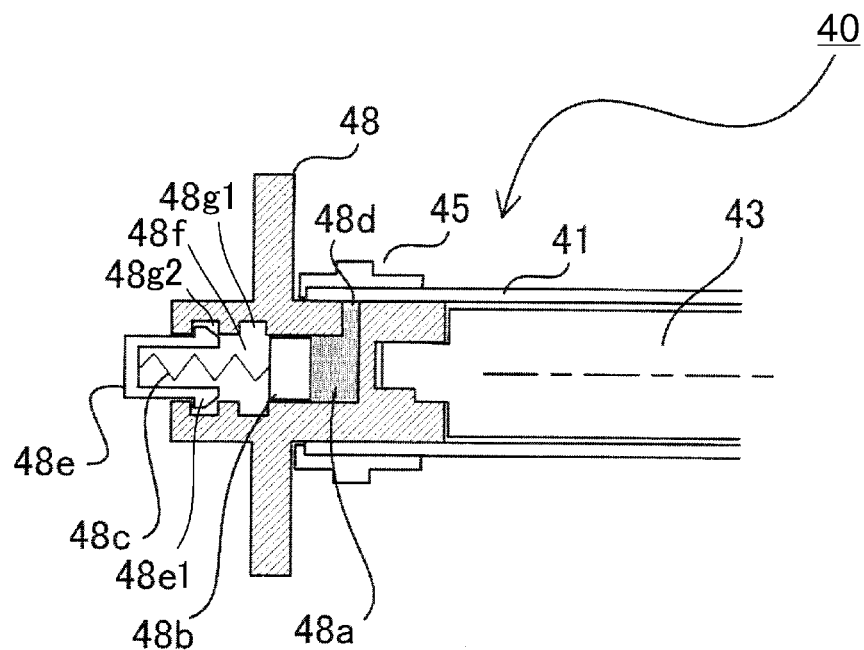

FIG. 7 is a schematic sectional view showing a state in which a supporting member in Embodiment 2 is applied with a sleeve cylinder.

Figure 8:
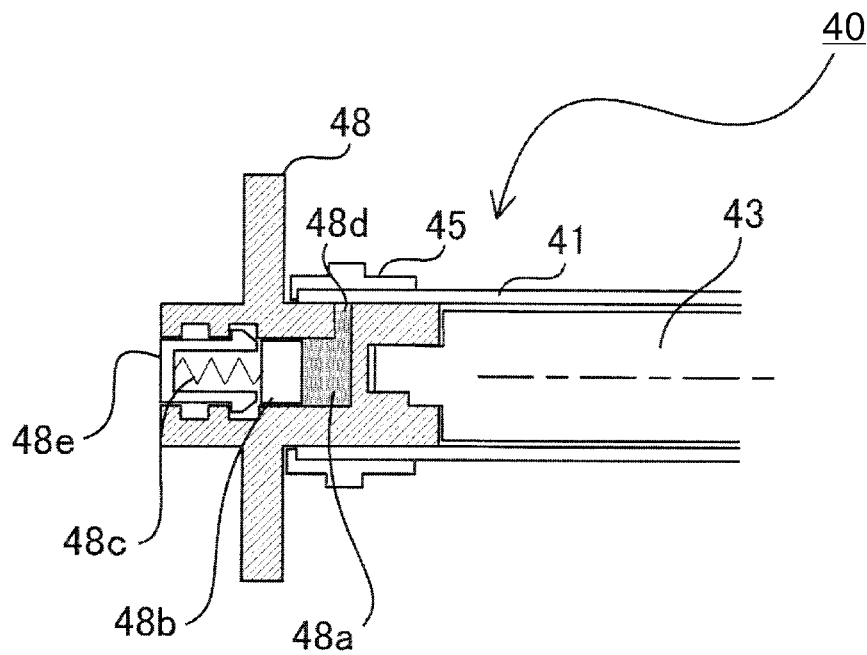

FIG. 8 is a schematic sectional view showing another state in which the supporting member in Embodiment 2 is applied with the sleeve cylinder.

DESCRIPTION OF THE PREFERRED EMBODIMENTS

Hereinbelow, embodiments for carrying out the present invention will be exemplarily and specifically described with reference to the drawings. However, dimensions, materials, shapes, relative arrangements and the like of constituent elements described in the following embodiments are appropriately changed depending on constitutions or various conditions of devices (apparatuses) to which the present invention is applied and thus the scope of the present invention is not limited thereto.

Embodiment 1

Embodiment 1 will be described.
(General Structure of Image Forming Apparatus)

Figure 1:
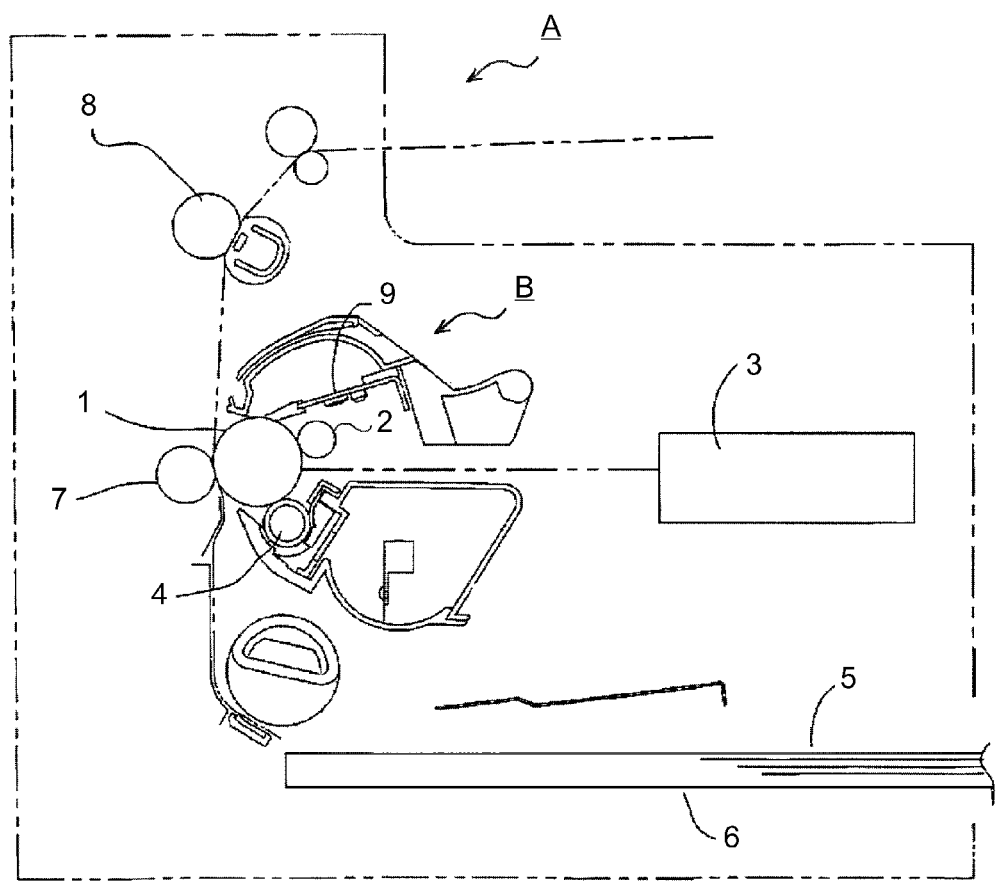
FIG. 1 is a sectional view showing a schematic structure of an electrophotographic image forming apparatus in Embodiment 1.

FIG. 1 is a schematic view showing a schematic structure of an electrophotographic image forming apparatus A.

In FIG. 1, the electrophotographic image forming apparatus A includes a photosensitive drum 1 as an image bearing member (electrophotographic photographic member). The photosensitive drum 1 is contact-charged uniformly by a charging roller 2 as a charging means and then is subjected to light exposure on the basis of image information by an optical scanner 3 as an exposure means, so that an electrostatic latent image is formed on the photosensitive drum 1. This electrostatic latent image is developed with toner (developer) and as a result, a toner image is formed on the photosensitive drum 1. The toner image on the photosensitive drum 1 is transferred onto a recording material 5 conveyed from a cassette 6 to a transfer position, by applying a voltage to a transfer roller 7 as a transfer means. The recording material 5 on which the toner image is transferred is heated and pressed by a fixing means, so that fixing is effected.
(Process Cartridge)

A process cartridge B includes the photosensitive drum 1 and at least one process means acting on the photosensitive drum 1. Here, the process means corresponds to the charging roller 2, a developing sleeve 4 as a developer carrying member, a cleaning blade or the like.

The photosensitive drum 1 includes an electroconductive support such as an aluminum cylindrical and includes a photosensitive layer formed on the support, and is rotatably supported by the process cartridge B. The charging roller 2 includes a core metal and an elastic layer formed on the core metal and is provided in press-contact with the surface of the photosensitive drum 1, and uniformly charges the surface of the photosensitive drum 1 by voltage application to the core metal.

The optical scanner 3 uses an optical system for converging laser light from a semiconductor laser on the photosensitive drum 1 and uses a polygon mirror or the like which rotates at high speed, thus enabling the light exposure of the surface of the photosensitive drum 1 depending on the image information. The electrostatic latent image is formed by a potential difference, on the surface of the photosensitive drum 1, caused by the light exposure.

The developing sleeve 4 carries the toner for visualizing the electrostatic latent image formed on the photosensitive drum 1. The developing sleeve 4 includes an aluminum cylindrical the surface of which has been subjected to coating with an electroconductive material or blasting or the like. On the surface of the developing sleeve 4, a thin toner layer is formed in a uniform thickness by a developer (thickness) regulating member or the like. By applying a voltage to the developing sleeve 4, the toner is transferred by the potential difference caused between the photosensitive drum 1 and the electrostatic latent image, so that the toner image depending on the image information is formed on the photosensitive drum 1.

The cleaning blade 9 is formed of an urethane rubber or the like and is provided in contact with the surface of the photosensitive drum 1 so as to be directed counter directionally to surface movement of the photosensitive drum 1, so that it is possible to remove a foreign matter such as toner remaining on the photosensitive drum 1 after the transfer onto the recording material 5.
(Developing Sleeve Unit)

Figure 2:
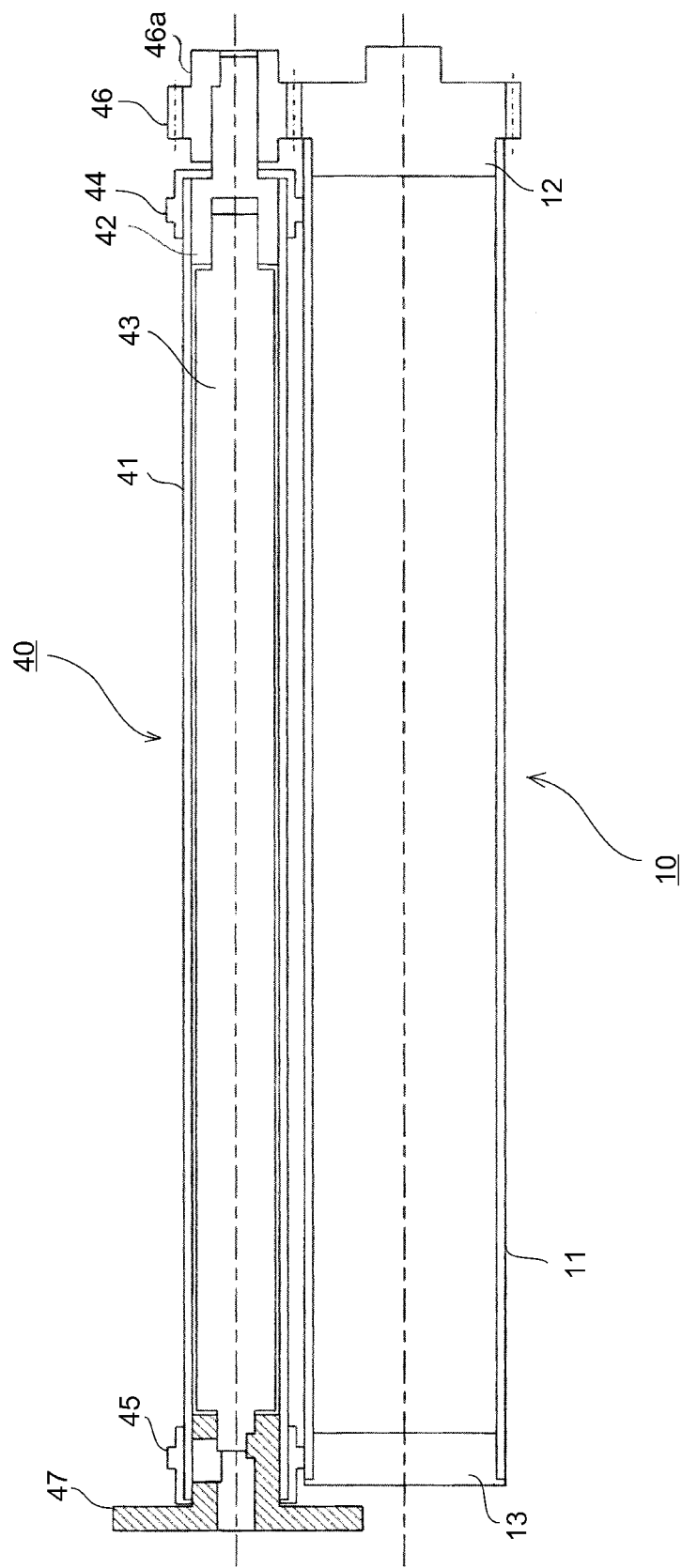
FIG. 2 is a schematic sectional view showing a developing sleeve unit and a photosensitive drum unit in Embodiment 1.

Next, with reference to FIG. 2, a constitution of the developing sleeve 4 and its periphery will be described in further detail. FIG. 2 is a schematic sectional view of a developing sleeve unit 40 and a photosensitive drum unit 10 which are disposed in the process cartridge B.

The photosensitive drum unit 10 is constituted by a drum cylindrical 11, a drum gear 12 and a drum flange 13. In FIG. 1, a portion indicated as the photosensitive drum 1 corresponds to the drum cylindrical 11. Both of the drum gear 12 and the drum flange 13 are provided integrally with the drum cylindrical 11 by a method such as clamp or press-fitting. A driving force is transmitted to the drum gear 12 by an unshown gear, so that the photosensitive drum 1 is rotated.

The developing sleeve unit 40 is constituted by a sleeve cylinder 41, a sleeve flange 42, a magnet roller 43, space (gap) holding members 44 and 45, a sleeve gear member 46 and a supporting member 47. In FIG. 1, a portion indicated as the developing sleeve 4 corresponds to the sleeve cylinder 41 as a rotatable member.

The sleeve cylinder 41 is provided integrally with the sleeve flange 42 by a method such as the press-fitting.

The sleeve cylinder 41 is provided with a D-cut portion which is to be engaged with the sleeve gear member 46 and is configured to be rotated by a driving force transmitted to the sleeve gear member 46.

The sleeve cylinder 41 provided integrally with the sleeve flange 42 is supported by an unshown bearing provided at an end portion 46a of the sleeve gear member 46 on its one end side with respect to its axial direction (rotational axis direction or a longitudinal direction) and is supported by the supporting member 47 on the other end side. Thus, the sleeve cylinder 41 is rotatably constituted. The supporting member 47 is constituted so as not to be rotated inside the process cartridge B, and the sleeve cylinder 41 is constituted so as to be slid on the supporting member 47.

The magnet roller 43 is supported by the supporting member 47 and the sleeve flange 42, and the D-cut portion formed on the magnet roller 43 is engaged with the supporting member 47, so that the magnet roller 43 is constituted so as not to rotate relative to the supporting member 47. As a result, magnetic flux density distribution formed by the magnet roller 43 can effectively act on toner circulation or development.

The spacing holding members 44 and 45 are provided at end portions of the sleeve cylinder 41 with respect to the axial direction and are constituted so as to contact the surface of the drum cylindrical 11. In the process cartridge B, the photosensitive drum unit 10 and the developing sleeve unit 40 are constituted so as to be urged against each other. Further, a gap between the surface of the photosensitive drum 1 and the surface of the developing sleeve 4 is set to be about 0.2-0.4 mm by the thickness of the spacing holding members 44 and 45.

The supporting member 47 is formed of the electroconductive resin material and not only performs the function of supporting the sleeve cylinder 41 and the magnet roller 43 as described above but also has the function as a developing bias (electrical) contact for the sleeve cylinder 41.

(Supporting Member)

Figure 3:
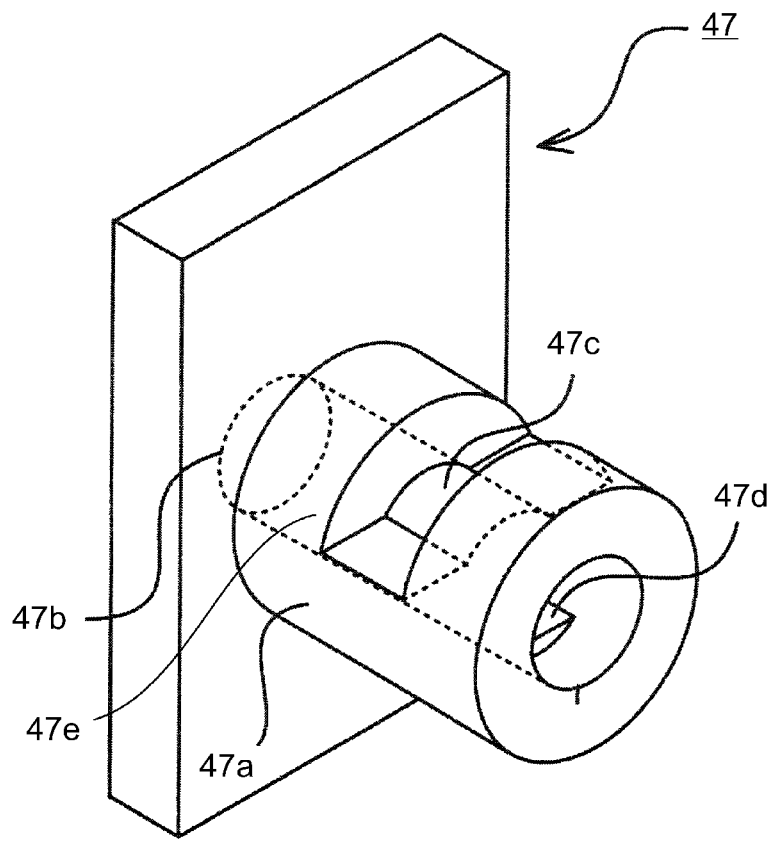
FIG. 3 is a schematic perspective view showing a supporting member in Embodiment 1.

Next, with reference to FIG. 3, the constitution of the supporting member 47 will be described in detail. FIG. 3 is a schematic perspective view showing the supporting member 47 in this embodiment.

The supporting member 47 includes a cylindrical portion 47a for supporting the sleeve cylinder 41, and an outer circumferential surface of the cylindrical portion 47a slidably supports the inner circumferential surface of the sleeve cylinder 41 with respect to a circumferential direction (rotational direction). Further, the cylindrical portion 47a is provided with a hollow portion 47e at an inner portion (inner circumferential side) thereof and is provided with openings (opening portions) 47b and 47c which communicate with the hollow portion 47e. Here, the opening 47c (first opening) is opened from the hollow portion 47e toward the inner circumferential surface of the sleeve cylinder 41. Further, the opening 47b (second opening) is an outward opening which is opened toward the outside of the sleeve cylinder 41 and corresponds to the outward opening provided in communication with the hollow portion 47e.

Further, of the cylindrical portion 47a, at the inner circumferential surface at the end portion on the sleeve cylinder 41 side with respect to the axial direction, a flat surface portion 47d for receiving the D-cut portion of the magnet roller 43 is provided.

As described above, the supporting member 47 also has the function as the contact for supplying the developing bias to the developing sleeve 4. Specifically, the supporting member 47 is formed by dispersing carbon black in acetal resin to have electroconductivity. Further, a contact on the image forming apparatus side is contacted to the supporting member 47, an output bias of a power source (not shown) incorporated in the image forming apparatus is supplied to the developing sleeve 4.

(Assembling Method of Developing Sleeve Unit)

Next, an applying method of the developing sleeve unit 40 will be described with reference to FIG. 4. Parts (a) and (b) of FIG. 4 are schematic views for illustrating the applying method of the developing sleeve unit 40. Part (a) of FIG. 4 is a schematic view for illustrating the applying method in which the sleeve flange 42 and the magnet roller 43 are applied with the sleeve cylinder 41. Part (b) of FIG. 4 is a schematic view for illustrating the applying method in which the spacing holding members 44 and 45, the sleeve gear member 46 and the supporting member 47 are applied with the sleeve cylinder 41 in a state in which the sleeve flange 42 and the magnet roller 43 have been applied with the sleeve cylinder 41.

First, the sleeve flange 42 is fixed at a right end portion of the sleeve cylinder 42 with respect to the axial direction by the method such as the press-fitting or the like. Thereafter, the magnet roller 43 is inserted into the sleeve cylinder 41 ((a) of FIG. 4). At this time, in order to improve a sliding property between a narrow shaft portion 43a at the right end portion of the magnet roller 43 and an inner circumferential surface 42a of the sleeve flange 42, lubricating oil is applied onto the narrow shaft portion 43a.

As shown in (b) of FIG. 4, the spacing holding members 44 and 45, the sleeve gear member 46 and the supporting member 47 are inserted into (applied with) the above-applied structure consisting of the sleeve cylinder 41, the sleeve flange 42 and the magnet roller 43. At this time, the spacing holding member 44 and the sleeve gear member 46 are inserted at the right side of the sleeve cylinder 41, and the spacing holding member 45 and the supporting member 47 are inserted at the left side of the sleeve cylinder 41. Specifically, the spacing holding member 44 and the sleeve gear member 46 are inserted in this order at the right side of the sleeve cylinder 41, and the spacing holding member 45 and the supporting member 47 are inserted in this order at the left side of the sleeve cylinder 41. The thus-applied developing sleeve unit 40 is fixed to a frame of the process cartridge B (not shown in (b) of FIG. 4) by a fixing means such as a screw or the like.

(Lubricant Applying (Supplying) Method)

An applying method of the lubricant for ensuring a lubricating property (sliding property) of a sliding portion between the inner circumferential surface (sliding surface) of the sleeve cylinder 41 of the developing sleeve unit 40 and the outer circumferential surface (sliding surface) of the cylindrical portion 47a of the supporting member 47 (of the developing sleeve unit 40) will be described with reference to FIG. 5.

FIG. 5 is a schematic sectional view showing a state in which an end of a nozzle 100a of a lubricant applying device 100 is inserted from the opening 47b, of the supporting member 47 of the developing sleeve unit 40 placed on an unshown stand (stage), into the supporting member 47. Here, the lubricant applying device may also be an injection syringe-like means.

The end portion of the nozzle 100a is inserted from the opening 47b of the supporting member 47 and is brought near to the inner circumferential surface of the sleeve cylinder 41 via the hollow portion 47e and the opening 47c. In a state in which the end portion of the nozzle 100a approaches the inner circumferential surface of the sleeve cylinder 41 with a spacing (gap) of 0.5-1 mm, electroconductive grease as the lubricant is ejected from the end portion of the nozzle 100a to be applied onto the inner circumferential surface (sliding portion) of the sleeve cylinder 41. An application position may desirably be at a portion, where sliding pressure is estimated that the pressure becomes maximum, e.g., in the neighborhood of the contact portion between the spacing holding member 45 and the photosensitive drum 1 with respect to the axial direction. During the ejection, when the sleeve cylinder 41 is rotated, it is possible to send the electroconductive grease to the sliding portion more efficiently.

(Recycling of Magnet Roller)

In this embodiment, the magnet roller 43 is constituted so as to be recyclable. As described above, in the developing sleeve unit 40, the supporting member 47 is not fixed to the sleeve cylinder 41 but is constituted so as to be rotatable (slidable). As a result, a resistance during demounting of the supporting member 47 from the sleeve cylinder 41 is decreased, so that the magnet roller 43 can be easily removed (demounted).

As described above, in this embodiment, the electroconductive grease is supplied from the opening, which is opened toward the inner circumferential surface of the sleeve cylinder 41, to the sliding portion between the sleeve cylinder 41 and the supporting member 47. Thus, in this embodiment, the electroconductive grease can be applied to the sliding portion after the sleeve cylinder 41 and the supporting member 47 are applied. As a result, different from the conventional case in which the electroconductive grease applied before the applying of the sleeve cylinder and the supporting member is moved by applying the sleeve cylinder with the supporting member, it is possible to supply the electroconductive grease in a necessary amount to the sliding portion with reliability. As a result, it becomes possible to further improve the sliding property. Further, it is possible to prevent contamination of the surface of the sleeve cylinder 41 with the electroconductive grease occurring in the conventional case in which the electroconductive grease applied before the applying of the sleeve cylinder and the supporting member is moved by applying the sleeve cylinder with the supporting member. Thus, it is possible to suppress an occurrence of the image defect due to adhesion of the electroconductive grease to the surface of the sleeve cylinder 41.

Therefore, the lubricant can be efficiently applied onto the sliding portion between the sleeve cylinder 41 and the supporting member 47 while preventing the contamination of the surface of the sleeve cylinder 41 with the electroconductive grease. Further, in the case where the supporting member 47 also functions as the contact for the sleeve cylinder 41, it becomes possible to obtain a better contact state.

Other Embodiments

Hereinbelow, as another embodiment, the case where the lubricant is supplied to a sliding portion between the photosensitive drum 1 as the cylindrical rotatable member and a supporting member 200, provided at one end side of the photosensitive drum 1 with respect to the axial direction (of the photosensitive drum 1), for rotatably (slidably) supporting the photosensitive drum 1 will be described. FIG. 6 is a schematic view showing a method of supplying the lubricant to the sliding portion between the photosensitive drum 1 and the supporting member 200.

Also in the case where the photosensitive drum 1 is the cylindrical rotatable member, similarly as in the above case where the description is made by using the developing sleeve, the electroconductive grease can be applied onto the inner circumferential surface (sliding portion) of the photosensitive drum 1 by being ejected from the end portion of the nozzle 100a of the lubricant applying device 100.

Embodiment 2

Embodiment 2 will be described below. FIGS. 7 and 8 are schematic sectional views each showing a state in which a supporting member 48 in this embodiment is applied with the sleeve cylinder 41.

The supporting member 48 supports, similarly as in the case of the supporting member in Embodiment 1, slidably in a circumferential direction (rotational direction) the inner circumferential surface of the cylindrical rotatable member, provided in the electrophotographic image forming apparatus, at one end side with respect to the axial direction of the rotatable member. Further, a rotatable member unit is constituted by applying the supporting member 48 with the cylindrical rotatable member. Incidentally, the electrophotographic image forming apparatus in this embodiment has the substantially same constitution as the electrophotographic image forming apparatus A in Embodiment 1 except for the constitution of the supporting member, and constituent portions similar to those in Embodiment 1 are represented by the same reference numerals or symbols and will be omitted from the description.

As shown in FIG. 7, the supporting member 48 in this embodiment is applied with the sleeve cylinder 41 similarly as in Embodiment 1 to constitute the developing sleeve unit 40. The supporting member 48 includes a temporary container portion 48a for temporarily accumulating the lubricant, and in this portion, the electroconductive grease is injected and accumulated (stored) in advance. Here, the temporary container portion 48a corresponds to the hollow portion.

The temporary container portion 48a is a space provided inside the supporting member 48 and is provided with two openings (opening portions). One of the two openings is an opening 48d (first opening) which is opened toward the inner circumferential surface of the sleeve cylinder 41 in the case where the developing sleeve unit 40 is applied. The other opening (second opening) is sealed, in a state in which the electroconductive grease is accumulated, by a sealing member 48b.

As a feature of this embodiment, the supporting member 48 includes an urging means for urging the lubricant accumulated in the temporary container portion 48a. The urging means is constituted by the sealing member 48b, a pressing member 48e and a spring member 48c provided between the urging member 48e and the sealing member 48b. Here, the pressing member 48e corresponds to an operating member which is displaced by being urged (from the outside of the supporting member 48). Further, the sealing member 48b corresponds to an urging member for urging the lubricant in the temporary container portion 48a (in the hollow portion) in the case where the pressing member 48e is pressed and displaced.

The pressing member 48e is provided with a locking claw 48e1, and the locking claw 48e1 is engaged with a recessed portion provided to an inner wall of the supporting member 48, so that the pressing member 48e is locked by a main body of the supporting member 48. The recessed portion of the supporting member 48 is provided at two portions consisting of an inner recessed portion 48g1 and an outer recessed portion 48g2 of the sleeve cylinder 41 with respect to the axial direction in the case where the supporting member 48 is applied with the sleeve cylinder 41. In a state in which the electroconductive grease is injected into the temporary container portion 48a of the supporting member 48 and before the process cartridge B is applied, the locking claw 48e1 is engaged with the recessed portion 48g2. In this state, the sealing member is located at a first position. Thus, in this embodiment, between the main body of the supporting member 48 and the pressing member 48e, a locking mechanism constituted by the recessed portions 48g1 and 48g2 and the locking claw 48e1 is provided.

During the assembling of the process cartridge B, the developing sleeve unit 40 is applied in the state in which the electroconductive grease is injected into the temporary container portion 48a of the supporting member 48 and then unshown necessary parts are assembled to complete the process cartridge B. After the process cartridge B is completed, as shown in FIG. 8, the pressing member 48e is further pressed into the supporting member 48 in the axial direction, so that the locking claw 48e1 is pressed to a position (second position) in which it is engaged with (caught by) a rear-side (the inner side with respect to the axial direction) recessed portion 48g1. The spring member 48e is compressed, so that the sealing member 48b is urged (pressed) toward the rear side. As a result, the electroconductive grease accumulated in the temporary container portion 48a is also urged (pressed) by the sealing member 48b, so that the electroconductive grease is supplied from the opening 48d to the inner circumferential surface of the sleeve cylinder 41. At this time, when the sleeve cylinder 41 is rotated, it becomes possible to apply the electroconductive grease onto the inner circumferential surface of the sleeve cylinder 41 more efficiently. Thus, also in this embodiment, the electroconductive grease can be applied from the temporary container portion 48a, via the opening 48d, to the sliding portion between the inner circumferential surface (slid surface) of the sleeve cylinder 41 and the outer circumferential surface (slid surface) of the supporting member 48.

According to this embodiment, in addition to the effect described in Embodiment 1, the following effect can be obtained. That is, compared with Embodiment 1, an amount of the lubricant and a lubricant supply position relative to the sleeve cylinder 41 with respect to the axial direction can be further stabilized, so that it is possible to further reliably obtain the sliding property and the electrical conductive property.

Here, the pressing of the pressing member 48e is not necessarily required to be performed after the assembling of the process cartridge B but may only be required to be performed after the assembling of the developing sleeve unit 40. For that reason, in a process cartridge assembling step, timing of the lubricant application can be selected and therefore the pressing of the pressing member 48e can be carried out which takes an efficiency of the entire steps into consideration, so that an assembling efficiency can be improved.

Further, in this embodiment, the urging means is constituted by the sealing member 48b, the pressing member 48e and the spring member 48c but is not limited thereto. That is, the urging means may only be required such that it can urge the lubricant in the temporary container portion 48a to supply the lubricant, via the opening 48d, to the sliding portion between the inner circumferential surface of the sleeve cylinder 41 and the outer circumferential surface of the supporting member 48.

Further, also in the case where the photosensitive drum 1 is the cylindrical rotatable member, as described above, it is possible to employ the supporting member similar to that applied in the case where the sleeve cylinder 41 is used as the cylindrical rotatable member.

Incidentally, in Embodiments 1 and 2 described above, the cases where the sleeve cylinder 41 and the photosensitive drum 1 are applied as the cylindrical rotatable member are described but the cylindrical rotatable member is not limited thereto. With respect to the cylindrical rotatable member provided in the electrophotographic image forming apparatus, when the supporting member is configured to slidably support the rotatable member at the inner circumferential surface on one end side of the rotatable member with respect to the axial direction, the present invention is suitably applicable.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 082634/2010 filed Mar. 31, 2010, which is hereby incorporated by reference.

What is claimed is:

1. A supporting member for slidably supporting an inner peripheral surface at one end side of a cylindrical rotatable member for use in an electrophotographic image forming apparatus with respect to an axial direction of the rotatable member, said supporting member comprising:
   a first opening, provided at a position in which said first opening opposes the inner peripheral surface of the rotatable member;
   a hollow portion which communicates with said first opening; and
   a second opening which is provided at a position in which said second opening is opened toward an outside of the rotatable member and which communicates with said hollow portion so that a lubricant is capable of being supplied to a sliding portion between the rotatable member and said supporting member from outside of said supporting member via said hollow portion and said first opening.

2. A supporting member for slidably supporting an inner peripheral surface at one end side of a cylindrical rotatable member for use in an electrophotographic image forming apparatus with respect to an axial direction of the rotatable member, said supporting member comprising:
   a first opening, provided at a position in which said first opening opposes the inner peripheral surface of the rotatable member, through which a lubricant is to be supplied to a sliding portion between said supporting member and the rotatable member;
   a hollow portion which communicates with said first opening; and
   a second opening which communicates with said hollow portion,
   wherein said hollow portion contains the lubricant,
   wherein said supporting member further comprises a sealing member for sealing said second opening, and
   wherein said sealing member is configured to supply the lubricant, contained in said hollow portion, to the inner peripheral surface of the rotatable member by being pushed in a direction approaching said first opening.

3. A rotatable member unit to be provided in an electrophotographic image forming apparatus, comprising:
   a cylindrical rotatable member;
   a supporting member for slidably supporting an inner peripheral surface at one end side of said cylindrical rotatable member;
   a first opening, provided in said supporting member at a position in which said first opening opposes the inner peripheral surface of said rotatable member;
   a hollow portion provided in said supporting member and which communicates with said first opening; and
   a second opening which is provided in said supporting member at a position in which said second opening is opened toward an outside of said rotatable member, and which communicates with said hollow portion so that a lubricant is capable of being supplied to a sliding portion between said rotatable member and said supporting member from outside of said supporting member via said hollow portion and said first opening.

4. A rotatable member unit to be provided in an electrophotographic image forming apparatus, comprising:
   a cylindrical rotatable member;
   a supporting member for slidably supporting an inner peripheral surface at one end side of said cylindrical rotatable member;
   a first opening, provided in said supporting member at a position in which said first opening opposes the inner peripheral surface of said rotatable member, through which a lubricant is to be supplied to a sliding portion between said supporting member and said rotatable member;
   a hollow portion provided in said supporting member and which communicates with said first opening; and
   a second opening which is provided in said supporting member and which communicates with said hollow portion,
   wherein said hollow portion contains the lubricant,
   wherein said supporting member further comprises a sealing member for sealing said second opening, and
   wherein said sealing member is configured to supply the lubricant, contained in said hollow portion, to the inner peripheral surface of said rotatable member by being pushed in a direction approaching said first opening.

* * * * *